United States Patent
Goto et al.

(10) Patent No.: US 7,399,814 B2
(45) Date of Patent: Jul. 15, 2008

(54) LIVING RADICAL POLYMERIZATION METHOD

(75) Inventors: Atsushi Goto, Uji (JP); Takeshi Fukuda, Uji (JP); Yoshinobu Tsujii, Uji (JP)

(73) Assignee: Kyoto University, Kyoto (JP)

( * ) Notice: Subject to any disclaimer, the term of this patent is extended or adjusted under 35 U.S.C. 154(b) by 0 days.

(21) Appl. No.: 11/459,370

(22) Filed: Jul. 24, 2006

(65) Prior Publication Data
US 2007/0049715 A1    Mar. 1, 2007

(30) Foreign Application Priority Data
Sep. 1, 2005  (JP)  ............................. 2005-254209
Jan. 23, 2006 (JP)  ............................. 2006-014431

(51) Int. Cl.
*C08F 4/20*  (2006.01)
*C08F 4/16*  (2006.01)
*C08F 4/72*  (2006.01)
*B01J 27/135* (2006.01)
*C07F 7/30*  (2006.01)

(52) U.S. Cl. ..................... 526/221; 526/184; 526/190; 526/192; 526/206; 526/219.2; 556/64; 556/70; 556/104; 502/152; 502/224; 502/227

(58) Field of Classification Search ................. 556/104, 556/64, 70; 526/190, 192, 184, 221, 219.2, 526/206; 502/152, 224, 227
See application file for complete search history.

(56) References Cited

U.S. PATENT DOCUMENTS 2,451,871 A  * 10/1948 Rochow ..................... 556/104
4,048,095 A  *  9/1977 Wojcik et al. ............... 502/169
5,312,871 A  *  5/1994 Mardare et al. ............. 525/272
5,403,803 A  *  4/1995 Shaffer et al. ............... 502/111
6,649,716 B2 * 11/2003 Andrekanic et al. ......... 526/221

FOREIGN PATENT DOCUMENTS

EP        1378535 A1  *  1/2004

(Continued)

OTHER PUBLICATIONS

Goto, et al, "Germanium and Tin-Catalyzed Living Radical Polymerization of Styrene", Polymer Preprints (ACS, Div. Poly. Chem.), 2005, 46(2), 245-246.*

(Continued)

*Primary Examiner*—Fred M Teskin
(74) *Attorney, Agent, or Firm*—Renner, Otto, Boiselle & Sklar, LLP

(57) ABSTRACT

A highly active and environment-friendly catalyst for use in a living radical polymerization is provided.

A catalyst for use in a living radical polymerization method is provided. The catalyst comprises a central element, which is selected from germanium, tin and antimony, and at least one halogen atom, which is bound to the central element. A monomer having a radical reactive unsaturated bond is subjected to a radical polymerization reaction under the presence of the catalyst, thereby it is possible to obtain a polymer having narrow molecular weight distribution. The present invention has the merits such as low toxicity of the catalyst, a small amount of the catalyst can be used, high solubility of the catalyst, mild reaction conditions, no coloration, no odor (unnecessary post-treatment of molded products). The method of the present invention is more environment-friendly and economical than a conventional living radical polymerization method.

18 Claims, 2 Drawing Sheets

FOREIGN PATENT DOCUMENTS

| | | |
|---|---|---|
| JP | 11-322822 | 11/1999 |
| JP | 2002-249505 | 9/2002 |

OTHER PUBLICATIONS

Kraus, et al, Studies Relating to Organic Germanium Derivatives. III. Diphenyl Germanium Dihalides and Diphenyl Germanium Imine, JACS, 52, 3690-6 (1930).*

Yuezhong, et al, "Free Radical Copolymerization in the Presence of Lewis Acid . . . ", China Synthetic Rubber Industry, 1990, 13(4), 253-258 (with English language translation).*

Krzysztof, Matyjaszewski et al.; "Controller/"Living" Radical Polymerization. Kinetics of the Homogenous Atom Transfer Radical Polymerization of Styrene"; Journal of the American Chemical Society; vol. 199, pp. 674-680, 1997.

* cited by examiner

LIVING RADICAL POLYMERIZATION METHOD

BACKGROUND OF THE INVENTION

1. Field of the Invention

The present invention is directed to a highly active catalyst, which is used for use in a living radical polymerization method, and a polymerization method using the catalyst. More specifically, the present invention uses a catalyst having a typical element (i.e., germanium, tin, or antimony) as a central element in a living radical polymerization method.

2. Description of the Related Art

A radical polymerization method has been a well known method for polymerizing a vinyl monomer to obtain a vinyl polymer. Generally, a radical polymerization method has the disadvantage of the difficulty in controlling the molecular weight of the obtained vinyl polymer. Further, there is the disadvantage that the obtained vinyl polymer is a mixture of compounds having various molecular weights, and thus it is difficult to obtain a vinyl polymer having a narrow molecular weight distribution. Specifically, even if the reaction is controlled, the ratio of weight-average molecular weight (Mw) and number-average molecular weight (Mn), (Mw/Mn), can be only reduced to about 2 to 3.

As a method for eliminating the aforementioned disadvantages, since around 1990, a living radical polymerization method has been developed. Specifically, according to the living radical polymerization method, it is possible to control the molecular weight. It is also possible to obtain a polymer having a narrow molecular weight distribution. Specifically, a polymer having Mw/Mn of 2 or less can easily be obtained. Therefore, this method has come into the limelight as a method for producing a polymer used in a high technology such as nanotechnology.

Catalysts which are currently used in living radical polymerization methods include transition metal complex-type catalysts.

For transition metal complex-type catalysts, complexes in which a ligand is coordinated to a compound having a central metal of Cu, Ni, Re, Rh, Ru, or the like have been used. Such catalysts are described in the following documents for example.

[patent document 1] Japanese Laid-open Patent Publication No. 2002-249505

[patent document 2] Japanese Laid-open Patent Publication No. 11-322822

[non-patent document 1] Journal of the American Chemical Society 119, 674-680 (1997)

Patent document 1 discloses that a complex with a central metal which is Cu, Ru, Fe, Ni or the like, and it is used as a catalyst.

Patent document 2 discloses that hydrido rhenium complex is used as a catalyst.

Non-patent document 1 discloses that a compound in which 4,4'-di-(5-nonyl)-2,2'-bipyridine is coordinated with copper bromide, is used as a catalyst.

However, when such transition metal complex catalysts are used, it is necessary to use a large amount of the catalyst. This is disadvantageous as it is not easy to completely remove the large amount of the catalyst used, from the products after the reaction. Another disadvantage is environmental problems which may occur by the disposal of the catalyst. The transition metal for the living radical polymerization method includes many toxic metals. The disposal of a large amount of such toxic metals causes environmental problems. Furthermore, there are cases where toxicities of catalysts remaining in products cause environmental problems. Due to the toxicity, it is difficult to use the transition metal catalysts for the production of food packages, material for living body, and medical material. Additionally, there is a problem associated with a high conductivity of the transition metal remaining in polymer, rendering the polymer conductive and hence unsuitable for use in electronic material such as resist material. Furthermore, the transition metal-type catalysts do not dissolve in a reaction solution unless they form a complex. Therefore, it is necessary to use a ligand as an additive to form a complex. This causes problems, i.e., an increase of the cost of production and also an increase of the total weight of the catalyst used. Further, a ligand is usually expensive and requires complicated synthesis method.

Living radical polymerization methods, which do not require a catalyst, have also been known. For example, a nitroxyl-type method and dithioester-type method have been known. However, these methods have the following disadvantages. A special protecting group (i.e., a certain nitroxide or dithioester group) must be introduced to the polymer growing chain. The protecting group is very expensive. Further, the polymerization reaction requires a high temperature (for example, 100° C. or higher). Further, the produced polymer is likely to have undesirable properties. For example, the produced polymer is likely to be colored differently from the natural color of the polymer. Further, the produced polymer is likely to have an odor.

SUMMARY OF THE INVENTION

The present inventors performed active research in order to solve the above-described problems, and as a result, solved the above-described problems and completed the present invention.

DISCLOSURE OF THE INVENTION

Problems to be Solved by the Invention

The present invention aims to solve the aforementioned problems. The objective of the present invention is to provide a catalyst having high activity for use in a living radical polymerization, and a method of polymerization using the catalyst.

Means for Solving the Problems

The present inventors earnestly conducted research to solve the above-mentioned problems and, have accomplished the present invention as a result. Specifically, according to the present invention, the following catalyst and polymerization methods are provided, and thereby the aforementioned problems are solved.

(1) A catalyst for use in a living radical polymerization method, which consists of a compound comprising at least one central element selected from germanium, tin or antimony, and at least one halogen atom which is bound to the central element.

(2) A catalyst according to the aforementioned item 1, which consists of a compound of the following general formula (I):

$$R^1{}_n MX^1{}_m \qquad (I)$$

wherein, $R^1$ is aryl or substituted aryl, n is an integer of 0 to 3,

M is a central element, which is germanium, tin or antimony, $X^1$ is a halogen, m is an integer of 1 to 4.

(3) A catalyst according to the aforementioned item 2, wherein $R^1$ is phenyl, lower alkyl phenyl or lower alkyloxyphenyl, $X^1$ is iodine, m is an integer of 2 to 4.

(4) A catalyst according to the aforementioned item 3, wherein M is germanium, $R^1$ is phenyl, lower alkyl phenyl or lower alkyloxyphenyl, $X^1$ is iodine, m is an integer of 2 to 4.

(5) A catalyst according to the aforementioned item 2, wherein M is tin or antimony, n is 0, $X^1$ is iodine, m is an integer of 2 to 4.

(6) A method of conducting a living radical polymerization, comprising a step of conducting a radical polymerization reaction of a monomer having a radically reactive unsaturated linkage, under the presence of a catalyst according to claim 1.

(7) A method of conducting a living radical polymerization, comprising a step of conducting a radical polymerization reaction of a monomer having a radically reactive unsaturated linkage, under the presence of an organic halide having a carbon-halogen linkage and a catalyst according to the aforementioned item 1.

(8) A method according to the aforementioned item 7, wherein the organic halide is a compound having the general formula (II):

$$CR^2R^3R^4X \qquad (II)$$

wherein, $R^2$ and $R^3$ are independently halogen, hydrogen or alkyl, $R^4$ is halogen, hydrogen, alkyl, aryl or cyano, $X^2$ is halogen.

(9) A method according to the aforementioned item 8, wherein a concentration of the catalyst is 1 weight % or less of the reaction solution, and the reaction temperature is 20° C. to 90° C.

EFFECTS OF THE INVENTION

According to the present invention, a catalyst having high activity for use in a living radical polymerization and a polymerization method using the catalyst are provided. This catalyst has the advantage of having low toxicity. This catalyst has the advantage of having high solubility in a reaction solution. Therefore, it is not necessary to add a ligand to form a complex. As this catalyst has high activity, the polymerization reaction does not require a high temperature of 100° C. or more. Further, the amount of the catalyst used can be reduced. Furthermore, the polymerization reaction does not require an expensive unique protecting group for protecting a polymer growing chain during a reaction. Additionally, molded products, which are obtained from the polymer obtained by the method of the present invention, have the advantage in which color or odor does not substantially occur during the molding process.

As described above, according to the present invention, a living radical polymerization method, which is significantly more environment-friendly and economically advantageous than conventional methods, has been realized.

These and other advantages of the present invention will become apparent to those skilled in the art upon reading and understanding the following detailed description with reference to the accompanying figures.

Figure 1:
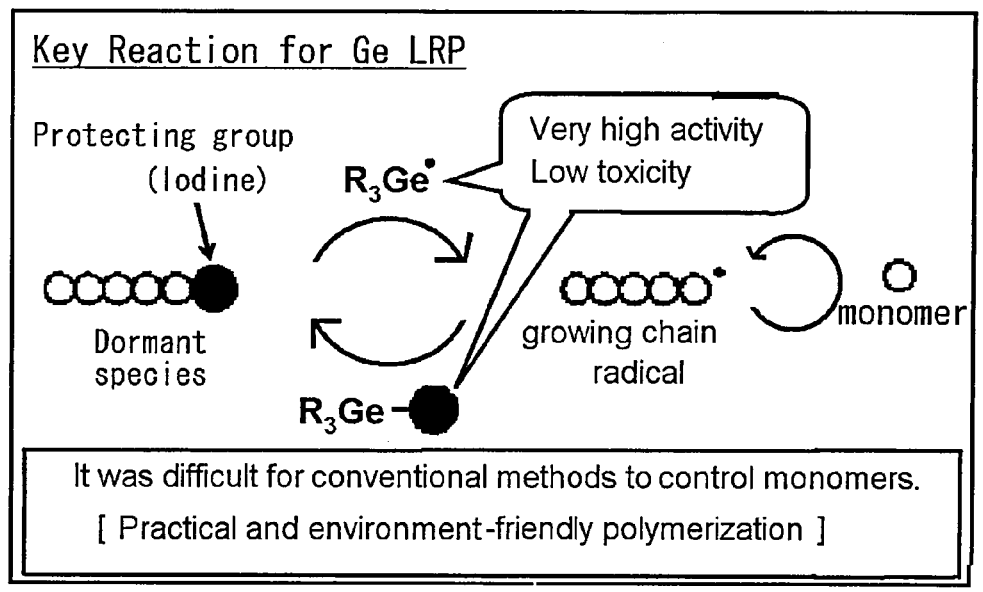
FIG. 1 shows a scheme representing the concept of the present invention.

$[PE-I]_0$=80 mM;

$[BPO]_0$=20 mM;

$[XA]_0$=5 mM, where XA is $GeI_4$, $GeI_2$, $SnI_4$, or $SnI_2$. The temperature was 60° C. for compounds containing Sn, and 80° C. for compounds containing Ge.

DESCRIPTION OF THE PREFERRED EMBODIMENTS

Hereinafter, the present invention will be described by way of illustrative examples with reference to the accompanying drawings.

The Best Mode for Carrying Out the Invention

Hereinbelow, the present invention will be explained in detail.

General Terms

Hereinafter, the terms, which are particularly used in the claims and the present specification, will be explained.

In the present specification, an "alkyl" refers to a monovalent group which is generated after a chain or cyclic aliphatic hydrocarbon (alkane) loses a hydrogen atom. In the cases of a chain alkyl group, the alkyl group is generally represented by $C_kH_{2k+1}$—(wherein, k is a positive integer). A chain alkyl group may be a straight chain or branched chain. A cyclic alkyl group may be consisted of a cyclic structure. A cyclic alkyl group may have a structure in which a chain alkyl group is linked to the cyclic structure. An alkyl group may have an arbitrary natural number of carbon atoms. Preferably, an alkyl group has 1 to 30 carbon atoms. More preferably, an alkyl group has 1 to 20 carbon atoms.

In the present specification, a "lower alkyl" refers to an alkyl group having a relatively small number of carbon atoms. Preferably, a lower alkyl is a $C_{1-10}$ alkyl group. More preferably, a lower alkyl is a $C_{1-5}$ alkyl group. Further preferably, a lower alkyl is a $C_{1-3}$ alkyl group. For instance, specific examples include methyl, ethyl, propyl and isopropyl.

In the present specification, a "substituted alkyl" refers to a group in which a hydrogen atom of an alkyl group is substituted with a substituent. Such a substituent includes aryl, cyano and the like.

In the present specification, a "halogenated substituted alkyl" refers to a compound in which a hydrogen of an alkyl group is substituted with a halogen, and another hydrogen of the alkyl group is substituted with another substituent. For, example, such another substituent includes an aryl group, a cyano group and the like.

In the present specification, an "aryl" refers to a group which is generated after a hydrogen atom, which is bound to a ring of an aromatic hydrocarbon, is removed. Specifically, for example, an aryl includes a phenyl group, naphthyl group, anthracenyl group, and the like.

In the present specification, a "substituted aryl" refers to a group which is generated after a substituent binds to an aryl group.

In the present specification, a "halogen" refers to a monovalent radical of an element, which belongs to the 7B group of the periodic table, such as a fluorine (F), chlorine (Cl), bromine (Br) and iodine (I).

In the present specification, a "living radical polymerization" refers to a polymerization reaction, in which a chain transfer reaction does not substantially occur in a radical polymerization reaction and a termination reaction does not substantially occur in the radical polymerization reaction, and the growing chain end maintains the activity even after the monomers have exhaustively reacted. According to this polymerization reaction, after completion of a polymerization reaction, a terminal of the generated polymer maintains the polymerization activity. If a monomer is added, then it is possible to start the polymerization reaction again.

A living radical polymerization is characterized in that, for example, a polymer having an arbitrary average molecular weight can be synthesized by adjusting the ratio of concentrations of a monomer and polymerization initiator, and the generated polymer has very narrow molecular weight distribution, and can be applied to a block copolymer. It is noted that a living radical polymerization is sometimes abbreviated as "LRP".

In the present specification, a "central element" refers to an atom in the compound of the catalyst, which is bound to a halogen atom and contributes mainly to the catalytic action. The "central element" has the same meaning as the term "central metal", which is used in the prior art. However, germanium, which can be used in the present invention, is generally a semiconductor and is not generally classified as a metal. Therefore, in order to avoid misunderstanding, the term "central element" is used in place of the term "central metal" in the prior art.

Hereinafter, the present invention will be explained in detail.

Catalyst

According to the present invention, a compound, which has a central element of germanium, tin, or antimony, is used as a catalyst for use in a living radical polymerization method.

This compound has at least one central element. In one preferred embodiment, the compound has one central element. However, the compound may have two or more central elements.

The central element is selected from germanium, tin and antimony, depending on the use of the polymer and the like. For example, when it is not desirable that a conductive compound remains in the polymer (for example, electronic material such as resist material), it is preferable to use a catalyst having a germanium atom as the central element. A polymer, in which no conductive compound remains, can be easily obtained by using a catalyst containing germanium.

Further, germanium is also advantageous in terms of toxicity to the human body and influence to the environment. Therefore, even if some conductive materials are permitted to remain, it is much more advantageous to use a catalyst containing germanium than a transition metal complex catalyst, which was used in prior art.

Further, a catalyst containing tin or antimony is preferably used for a product in which conductive material is permitted to remain.

Furthermore, the catalyst of the present invention has the characteristic that a small amount of the catalyst can exert its catalytic action. Therefore, as described above, it was made possible that material having little toxicity to the human body and little influence to the environment is used in a small amount. The catalyst of the present invention is much superior to a conventional catalyst.

Halogen Atom in the Catalyst

In the aforementioned compound of the catalyst, at least one halogen atom is bound to the central element. If the aforementioned compound of the catalyst has two or more central elements, at least one halogen atom is bound to each of the central element. The halogen atom is preferably, chlorine, bromine or iodine. More preferably, the halogen atom is iodine. Two or more halogen atoms may exist in one molecule. For example, two atoms, three atoms, or four atoms may exist in one molecule. More than four atoms may exist in one molecule. Preferably, two to four halogen atoms exist in one molecule. When there are two or more halogen atoms in one molecule, the plurality of halogen atoms may be the same or different.

Groups Other than Halogen in the Catalyst

If necessary, the compound of the catalyst may have a group other than halogen. For example, it is possible that an arbitrary organic group or inorganic group is bound to the central element.

Such a group may be an organic group or an inorganic group. An organic group includes an aryl group, substituted aryl group, alkoxy group (methoxy group and the like), ester group (aliphatic carboxylic acid ester and the like), haloalkyl group (trifluoromethyl group and the like), and the like. In one preferred embodiment, the group may be aryl group or substituted aryl group.

Further, the inorganic group includes a hydroxyl group, amino group, cyano group and the like.

A compound of a catalyst having an organic group, in particular, an aryl group or substituted aryl group, has the tendency of enhanced activity of the radical, and therefore is preferable.

In a substituted aryl group, the substituent, which is bound to the aryl group, includes an alkyl group, alkyloxy group and the like. This alkyl is preferably a lower alkyl group, more preferably, a $C_1$ to $C_5$ alkyl group. This alkyl is further preferably a $C_1$ to $C_3$ alkyl group, and particularly preferably, a methyl group. The alkyl group in the alkyloxy group is preferably a lower alkyl group, more preferably a $C_1$ to $C_5$ alkyl group, further preferably a $C_1$ to $C_3$ alkyl group, and particularly preferably a methyl group. Thus, in one embodiment, an organic group, which is bound to the central element, is a phenyl group, lower alkyl phenyl group or lower alkyloxyphenyl group.

There is no limitation for the number of the aforementioned organic groups and inorganic groups. However, the number of the aforementioned organic groups or inorganic groups is preferably three or less, and more preferably one.

It is noted that there is no limitation for the number of the substituents of the substituted aryl group. However, the number of the substituents of the substituted aryl group is preferably 1 to 3, and more preferably 1 to 2, and further preferably 1.

Regarding the position of the substituent in the substituted aryl group, an arbitrary position may be selected. When the aryl group is a phenyl group (that is, the substituted aryl group is a substituted phenyl group), the position of the substituent may be ortho, meta, or para with respect to the central element. Preferably, the position is at para.

It is noted that a ligand can be coordinated with the compound of the catalyst of the present invention to form a complex, such that the complex can be used in a polymerization reaction. However, the compound of the catalyst of the present invention can usually be directly used for a polymerization reaction. It is not necessary to add a ligand to form a complex. In cases of transition metal complex-type catalysts, which were used in the prior art, the transition metal compounds are generally hardly soluble in a reaction solution. It was necessary to add an appropriate ligand to form a complex. However, according to the present invention, it is not necessary to add a ligand. If a ligand is not used, it is advantageous in terms of the cost of the material. Further, it is advantageous that the weight of the catalyst used can be reduced. Further, amine compounds which are generally used for ligands, are expensive, or require complicated synthesis method. Further, in view of the properties of amines, it is considered that a transition metal-amine complex is likely to be adsorbed to a produced polymer molecule, and therefore, it becomes further difficult to remove the catalysts.

Manufacturing Method of the Catalyst

Most of the compounds, which are used as catalyst of the present invention, are known. The compounds, which are commercially available from reagents sales company or the like, can directly be used. Alternatively, the compounds can be synthesized by using known methods.

When a catalyst in which an organic group $R^1$ (for example, an aryl group or substituted aryl group) is bound to germanium is to be used, such a compound can be synthesized by using a known method. For example, $R^1I$, which is an iodide of an organic group $R^1$, is reacted with germanium iodide. According to this reaction method, $R^1GeI_3$ can be synthesized.

$$R^1-I + GeI_2 \rightarrow R^1GeI_3$$

In many cases, the iodide, $R^1I$, is a liquid. In cases where $R^1I$ is a liquid, it is possible to perform the reaction without a solvent. However, if necessary, a solvent such as benzene and toluene may be used. Further, if the iodide $R^1I$ is a solid, a solvent such as benzene and toluene can be used. It is noted that even if no particular catalyst is used, this reaction proceeds. A specific example of such a reaction is described in, for example, *Journal of Organometallic Chemistry* 56, 1-39 (1973). If the method described therein is applied, compounds in which various organic groups R are bound to germanium can be synthesized.

When a catalyst, in which an organic group $R^1$ (for example, an aryl group or substituted aryl group) is bound to tin, is to be used, such compound can be synthesized with a known method. For example, $(R^1)_nSnI_m$ (n+m=4, and n=1, 2 or 3) can be synthesized by a method in which $(R^1)_4Sn$ is reacted with $SnI_4$. Specific examples of such a reaction are described in, for example, *Angewandte Chemie* 75, 225-235 (1963) and the like. If the method described therein is applied, compounds in which various organic groups R are bound to tin can be synthesized.

When a catalyst, in which organic group $R^1$ (for example, an aryl group or substituted aryl group) is bound to antimony, is to be used, such compound can be synthesized with a known method. For example, it can be synthesized with a method which is similar to those described above for germanium or tin.

Amount of the Catalyst Used

The catalyst of the present invention has very high activity and can catalyze a living radical polymerization in a small amount.

In a preferred embodiment, it is possible that the catalyst in an amount of 10 millimoles (mM) or less is used to one liter of reaction solution. In a further preferred embodiment, it is possible that the catalyst in an amount of 5 millimoles (mM) or less is used to one liter of reaction solution. It is also possible that the catalyst in an amount of 2 millimoles (mM) or less is used to one liter of reaction solution. Regarding the weight of the catalyst, the amount of the used catalyst can be 1 weight % or less in a reaction solution. In a further preferred embodiment, the amount of the used catalyst can be 0.5 weight % or less in a reaction solution. Also, the amount of catalyst used can be 0.2 weight % or less in a reaction solution.

Further, the amount of the catalyst used is preferably 0.1 millimoles or more to one liter of a reaction solution. More preferably, the amount is 0.5 millimoles or more to one liter of a reaction solution. Further preferably, the amount is 0.8 millimoles or more to one liter of a reaction solution.

Regarding the weight of the catalyst, preferably, an amount of the catalyst used is 0.01 weight % or more in a reaction solution. More preferably, the amount is 0.05 weight % or more in a reaction solution. Further preferably, the amount is 0.08 weight % or more in a reaction solution. If the amount of the catalyst used is too small, then the molecular weight distribution is likely to be broad.

Protecting Group

The method of the present invention uses a protecting group for protecting the growing chain during the living radical polymerization reaction. Regarding the protecting group, various known protecting groups, which were conventionally used as protecting groups in a living radical polymerization, can be used.

Organic Halide

In one preferred embodiment of the method of the present invention, an organic halide, which has a carbon-halogen bond, is added to the reaction material. Halogen, which is attached to the growing chain by the organic halide, is used as a protecting group. Such organic halides are relatively inexpensive. Therefore, it is more advantageous than other compounds which are used as protecting groups in a living radical polymerization.

The organic halide is a compound which has at least one carbon-halogen bond in the molecule. There is no other particular limitation to the organic halide. Generally, the organic halide preferably has one or two halogen atoms in the molecule.

The halogen atom in the organic halide may be the same as the halogen atom in the catalyst. The halogen atom in the organic halide may be different from the halogen atom in the catalyst, since even if the halogen atom of the organic halide and the halogen atom of the catalyst are different, it is possible that the halogen atom of the organic halide and the halogen atom of the catalyst are exchanged. However, if the halogen atom in the organic halide and the halogen atom in the catalyst are the same, it is easier to exchange the halogen atoms between the organic halide and the compound of the catalyst. Therefore, preferably, the halogen atom in the organic halide and the halogen atom in the catalyst are the same.

In one embodiment, the organic halide has the following general formula (II):

$$CR^2R^3R^4X^2 \qquad (II)$$

wherein, $R^2$ is halogen, hydrogen or alkyl. Preferably, $R^2$ is hydrogen or lower alkyl. More preferably, $R^2$ is hydrogen or methyl.

$R^3$ may be the same as $R^2$, or may be different from $R^2$. $R^3$ is halogen, hydrogen or alkyl. Preferably, $R^3$ is hydrogen or lower alkyl. More preferably, $R^3$ is hydrogen or methyl.

$R^4$ is halogen, hydrogen, alkyl, aryl or cyano. Preferably, $R^4$ is aryl or cyano. When $R^4$ is halogen, hydrogen or alkyl, $R^4$ may be the same as $R^2$ or $R^3$, or may be different from $R^2$ or $R^3$.

$X^2$ is halogen. Preferably, $X^2$ is chlorine, bromine or iodine. When there is a halogen in $R^2$ to $R^4$, $X^2$ may be the same as the halogen in $R^2$ to $R^4$, or may be different from the halogen in $R^2$ to $R^4$. In one embodiment, $X^2$ may be the same halogen as that contained in the compound of the catalyst. $X^2$ may be different from the halogen contained in the catalyst of the compound.

The aforementioned $R^2$ to $R^4$ and $X^2$ are selected independently from each other. However, preferably, there is no halogen atom or one halogen atom in $R^2$ to $R^4$ (that is, the organic halide contains one or two halogen atoms in the compound).

In one preferable embodiment, the organic halide is halogenated alkyl or halogenated substituted alkyl. More preferably, the organic halide is halogenated substituted alkyl. In this regard, preferably, the alkyl is a secondary alkyl. More preferably, the alkyl is a tertiary alkyl. That is, preferably, the carbon, which is bound to the halogen atom of the organic halide, has two or less hydrogen atoms. More preferably, the carbon has one or less hydrogen atom. Further preferably, the carbon does not have a hydrogen atom.

In the halogenated alkyl or halogenated substituted alkyl, the number of carbon atoms in the alkyl is preferably 2 or 3. Therefore, further preferably, the organic halide is halogenated substituted ethyl or halogenated substituted isopropyl. The substituent in the halogenated substituted alkyl includes, for example, phenyl, cyano and the like.

Preferable specific examples of the organic halide include $CH(CH_3)(Ph)I$ and $C(CH_3)_2(CN)I$, as shown in the following chemical formulas.

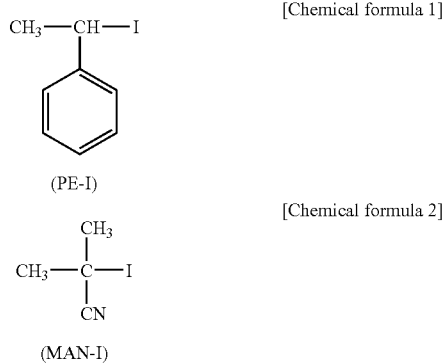

Other specific examples of the organic halide include, for example, methyl chloride, methylene chloride, chloroform, carbon tetra chloride, chloroethane, dichloroethane, trichloroethane, tetrachloroethane, bromomethyl, dibromomethane, bromoform, tetrabromomethane, bromoethane, dibromoethane, tribromoethane, tetrabromoethane, bromotrichloromethane, dichlorodibromomethane, chlorotribromomethane, iodotrichloromethane, dichlorodiiodomethane, iodotribromomethane, dibromodiiodomethane, bromotriiodomethane, tetraiodomethane, iodoform, diiodomethane, methyl iodide, isopropyl chloride, t-butyl chloride, isopropyl bromide, t-butyl bromide, triiodoethane, ethyl iodide, diiodopropane, isopropyl iodide, t-butyl iodide, bromodichloroethane, chlorodibromoethane, bromochloroethane, iododichloroethane, chlorodiiodoethane, diiodopropane, chloroiodopropane, iododibromoethane, bromoiodopropane, and the like. One of these halide compounds may be used alone, or a combination of two or more of the halide compounds may be used.

In the method of the present invention, the amount of the organic halide used is, preferably 0.05 moles or more to 1 mole of the radical polymerization initiator in the polymerization reaction system. More preferably, the amount is 0.5 moles or more to 1 mole of the radical polymerization initiator. Further preferably, the amount is 1 mole or more to 1 mole of the radical polymerization initiator. Further preferably, the amount is 100 moles or less to 1 mole of the radical polymerization initiator in the polymerization system. More preferably, the amount is 30 moles or less to 1 mole of the radical polymerization initiator. Further preferably, the amount is 5 moles or less to 1 mole of the radical polymerization initiator. Additionally, the amount is preferably 0.001 moles or more to 1 mole of the vinyl-type monomer. More preferably, the amount is 0.005 moles or more to 1 mole of the vinyl-type monomer. Further, the amount is preferably 0.5 moles or less to 1 mole of the vinyl-type monomer. More preferably, the amount is 0.1 moles or less to 1 mole of the vinyl-type monomer.

Most of the aforementioned organic halides are known compounds. Reagents, which are sold from reagent sellers or the like, can directly be used. Alternatively, the compounds may be synthesized with conventionally known synthesizing methods.

Monomer

As a monomer, the polymerization method of the present invention uses a radical polymerizable monomer. A radical polymerizable monomer refers to a monomer having an unsaturated bond which may be subjected to a radical polymerization under the presence of an organic radical. Such an unsaturated bond may be a double bond or triple bond. That is, the polymerization method of the present invention can use an arbitrary monomer, which was conventionally known as a monomer for performing a living radical polymerization.

More specifically, the so-called vinyl monomers can be used. Vinyl monomer is a general name for monomers which are represented by the general formula "$CH_2=CR^5R^6$".

A monomer having the general formula in which $R^5$ is methyl, and $R^6$ is carboxylate, is referred to as a methacrylate-type monomer, and can preferably be used in the present invention.

Specific examples of the methacrylate-type monomer include methyl methacrylate, ethyl methacrylate, propyl methacrylate, n-butyl methacrylate, t-butyl methacrylate, hexyl methacrylate, 2-ethylhexyl methacrylate, nonyl methacrylate, benzyl methacrylate, cyclohexyl methacrylate, lauryl methacrylate, n-octyl methacrylate, 2-methoxyethyl methacrylate, butoxyethyl methacrylate, methoxytetraethyleneglycol methacrylate, 2-hydroxyethyl methacrylate, 2-hydroxypropyl methacrylate, 3-chloro-2-hydroxypropyl-methacrylate, tetrahydrofurfuryl methacrylate, 2-hydroxy-3-phenoxypropyl methacrylate, diethyleneglycol methacrylate, polyethyleneglycol methacrylate, 2-(dimethylamino)ethyl-methacrylate, and the like. Further, methacrylic acid can be used.

The aforementioned vinyl monomers having the aforementioned general formula in which $R^5$ is a hydrogen and $R^6$ is carboxylate, are generally referred to as acrylic type monomers and can preferably be used in the present invention.

Specific examples of the acrylate-type monomer include methyl acrylate, ethyl acrylate, propylacrylate, n-butylacrylate, t-butyl acrylate, hexyl acrylate, 2-ethylhexyl acrylate, nonylacrylate, benzylacrylate, cyclohexylacrylate, lauryl acrylate, n-octyl acrylate, 2-methoxyethyl acrylate, butoxyethyl acrylate, methoxytetraethyleneglycol acrylate, 2-hydroxyethyl acrylate, 2-hydroxypropyl acrylate, 3-chloro-2-hydroxypropyl acrylate, tetrahydrofurfuryl acrylate, 2-hydroxy-3-phenoxypropyl acrylate, diethyleneglycol acrylate, polyethyleneglycol acrylate, 2-(dimethylamino)ethyl acrylate, N,N-dimethylacrylamide, N-methyrolacrylamide, N-methyrolmethacrylamide, and the like. Further, an acrylic acid can be used.

A monomer having the aforementioned general formula of a vinyl monomer, in which $R^5$ is a hydrogen, and $R^6$ is phenyl, is styrene, which can be suitably used in the present invention. A monomer, in which $R^6$ is phenyl or a phenyl derivative, is referred to as a styrene derivative, which can suitably be used in the present invention. Specifically, such a monomer includes o-, m-, or p-methoxystyrene, o-, m-, or p-t-butoxystyrene, o-, m-, or p-chloromethylstyrene, and the like.

A monomer having the aforementioned general formula of a vinyl monomer, in which $R^5$ is a hydrogen and $R^6$ is alkyl, is alkylene, which can be suitably used in the present invention.

In the present invention, monomers having two or more vinyl groups can be used. Specifically, for example, a diene-type compound (e.g., butadiene, isoprene and the like), a compound having two allyl groups (for example, diallyl isophthalate and the like), a dimethacrylate of a diol compound, a diacrylate of a diol compound, and the like, can be used.

Vinyl monomers other than those described above can also be used in the present invention. Specifically, for example, vinyl esters (for example, vinyl acetate, vinyl propionate, vinyl benzoate), vinyl ketones (for example, vinyl methyl ketone, vinyl hexyl ketone, methyl isopropenyl ketone), N-vinyl compound (for example, N-vinyl pyrrolidone, N-vinyl pyrrole, N-vinyl carbazole, N-vinyl indole), (meth)acrylic acid derivative (for example, acrylonitrile, methacrylonitrile, acrylamide, isopropyl acrylamide, methacrylamide), halogenated vinyls (for example, vinyl chloride, vinylidene chloride, tetrachloroethylene, hexachloropropylene, vinyl fluoride), acrylic acid, methacrylic acid, and the like.

One of these monomers may be used alone, or a combination of two or more of the monomers may be used.

There is no particular limitation to the combination of the aforementioned monomer and the catalyst of the present invention. A catalyst of the present invention, which is arbitrarily selected, may be used for a monomer, which is arbitrarily selected. However, regarding methacrylate-type monomers, a catalyst having a substituent having an aromatic ring, more specifically a catalyst having aryl or substituted aryl is more preferably used in terms of the reactivity, than the other catalysts.

Radical Reaction Initiator

In the living radical polymerization method of the present invention, if necessary, an adequate amount of a radical reaction initiator is used. Initiators, which are known as radical reaction initiators, can be used as the radical reaction initiator. For example, azo-type radical reaction initiators and peroxide-type radical initiators can be used. Specific examples of the azo-type radical reaction initiators include, for example, azobis(isobutyronitrile). Specific examples of peroxide-type radical initiators include, for example, benzoylperoxide.

The amount of the radical initiator used is not particularly limited. However, preferably, the amount is 1 millimole or more to 1 liter of the reaction solution. More preferably, the amount is 5 millimoles or more to 1 liter of the reaction solution. Further preferably, the amount is 10 millimoles or more to 1 liter of the reaction solution. Additionally, the amount is preferably 500 millimoles or less to 1 liter of the reaction solution. More preferably, the amount is 100 millimoles or less to 1 liter of the reaction solution. Further preferably, the amount is 50 millimoles or less to 1 liter of the reaction solution.

Solvents

When a reaction mixture including the monomer is liquid at the reaction temperature, it is not always necessary to use a solvent. If necessary, a solvent may be used. Solvents, which were conventionally used for a living radical polymerization, can be used in the method of the present invention.

Reaction Temperature

A reaction temperature in the method of the present invention is not particularly limited. Preferably, the reaction temperature is 10° C. or more. More preferably, the reaction temperature is 20° C. or more. Further preferably, the reaction temperature is 30° C. or more. Still preferably, the reaction temperature is 40° C. or more. Particularly preferably, the reaction temperature is 50° C. or more. Additionally, the reaction temperature is preferably 130° C. or less. More preferably, the reaction temperature is 110° C. or less. Further preferably, the reaction temperature is 100° C. or less. Still preferably, the reaction temperature is 90° C. or less. Particularly preferably, the reaction temperature is 85° C. or less.

When the temperature is too high, there is a disadvantage that heating facilities and the like may be expensive. When the temperature is a room temperature or lower, there is a disadvantage that cooling facilities and the like may be expensive. Additionally, if a reaction mixture is prepared such that polymerization occurs at a room temperature or lower, the reaction mixture is unstable at room temperature and may react. Therefore, there is the disadvantage that it is difficult to store the reaction mixture. Therefore, the aforementioned range of the temperature, which is slightly higher than room temperature but is not too high (for example, 50° C. to 85° C.) is very preferable in term of the practical sense.

Reaction Period of Time

The reaction time period in the method of the present invention is not particularly limited. Preferably, the reaction time period is 15 minutes or more. More preferably, the reaction time period is 30 minutes or more. Further preferably, the reaction time period is 1 hour or more. Additionally, the reaction time period is preferably 3 days or less. More preferably, the reaction time period is 2 days or less. Further preferably, the reaction time period is 1 day or less.

If the reaction time period is too short, it is difficult to obtain a sufficient molecular weight. If the reaction period of time is too long, the efficiency of the entire process would be unsatisfactory. Advantageous results (an adequate monomer conversion and reduction of a side reaction) may be achieved by selecting a suitable reaction time period.

Reaction Mechanism

Although the present invention is not particularly bound to a theory, an inferred-mechanism will be explained.

The basic concept of a living radical polymerization method is a reversible activating reaction of a dormant species (P—X) to a growing chain radical (P.). A method, which uses a halogen as protecting group X and uses a transition metal complex as an activating catalyst, is one of useful living radical polymerization methods. According to the present invention, Ge compound, Sn compound or Sb compound is used. It is possible to abstract a halogen from an organic halide with high reactivity. It is possible to produce a radical reversibly (Scheme 1).

It has been recognized that, generally, a transition metal can have electrons in various transition states and therefore, a transition metal is superior in the catalytic activity for various chemical reactions. Therefore, regarding catalysts suitable for a living radical polymerization, it was considered that a transition metal is superior. On the contrary, a typical element is considered disadvantageous for such a catalyst.

However, according to the present invention, germanium, tin or antimony, which are typical elements, is used as a central element in the catalyst. According to the present invention, unexpectedly, as shown in the scheme of FIG. 1, the halogen is exchanged between the catalyst and the growing chain radical, and the polymerization reaction proceeds with very high efficiency. It is considered that this is because the linkage between the central element and the halogen is suitable for performing the exchange of the halogen with the growing chain radical. Basically, it is considered that a compound having the linkage between the central element and the halogen can catalyze the living radical polymerization satisfactorily even if the compound has a substituent other than the central element and halogen.

(Scheme 1)

[Chemical formula 3]

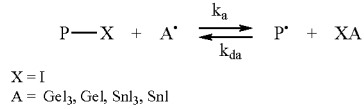

$X = I$
$A = GeI_3, GeI, SnI_3, SnI$

Use of the Polymer

According to the aforementioned living radical polymerization method of the present invention, a polymer having a narrow molecular weight distribution is obtained.

For example, it is possible to select a suitable formulation of reaction material, reaction conditions and the like, such that a polymer having the Mw/Mn ratio, which is the ratio of the weight average molecular weight Mw to the number average molecular weight Mn, is 1.5 or less. It is also possible to select a further suitable formulation of the reaction material and reaction conditions such that a polymer having the Mw/Mn ratio of 1.4 or less is obtained. It is also possible to select a further suitable formulation of the reaction material and reaction conditions such that a polymer having the Mw/Mn ratio of 1.3 or less is obtained. It is also possible to select a further suitable formulation of the reaction material and reaction conditions such that a polymer having the Mw/Mn ratio of 1.2 or less is obtained. It is also possible to select a further suitable formulation of the reaction material and reaction conditions such that a polymer having the Mw/Mn ratio of 1.1 or less is obtained.

The polymer obtained by the living radical polymerization method of the present invention can be applied for various uses. For example, the polymer can be used for manufacturing resist material, adhesive, lubricant, paint, ink, packaging material, pharmaceuticals, a personal care product (hairdressing material, cosmetics and the like), and the like.

Further, when germanium, which does not have conductivity, is used as a central element of the catalyst, the obtained polymer can be preferably used as resist materials and the like, which necessitate that no conductive impurity remain in the polymer.

EXAMPLES

Hereinafter, Examples of the present invention will be explained. However, the present invention is not limited by these Examples.

Example 1 and Comparative Example 1

0.0186 g of 1-phenylethyl iodide (PE-I) was used as a halogenated alkyl. 0.0029 g of $GeI_4$ was used as a Ge compound. 0.0048 g of benzoyl peroxide (BPO) was used as a radical initiator. These materials were dissolved in 1 g of styrene to form a reaction solution. The solubility of these materials was satisfactory, and a homogenous solution was formed. Concentrations in the reaction solution were as follows:

PE-I: 80 mM, $GeI_4$: 5 mM, and BPO: 20 mM.

The remaining oxygen was replaced with argon. The reaction solution was heated to 80° C. to perform the polymerization reaction.

It is noted that regarding concentrations, "mM" refers to the number of millimoles to 1 liter of a monomer. For example, 80 mM means that 80 millimoles of a solute is dissolved in 1 liter of a monomer.

The experiments Nos. 1 to 12 as well as C1 and C2 were performed using the reaction materials and reaction conditions as shown in Tables 1 and 2. The experiments Nos. 1 to 12 are relevant to the experiments of Example 1. The experiments Nos. C1 and C2 are relevant to the experiments of Comparative Example 1.

According to the polymerization, BPO decomposes to generate the radical "P.". The radical abstracts an iodine atom from $GeI_4$ (deactivating agent), giving a P—X and an activating agent $GeI_3$. Thus, the reversible activating reaction occurs.

Figure 2:
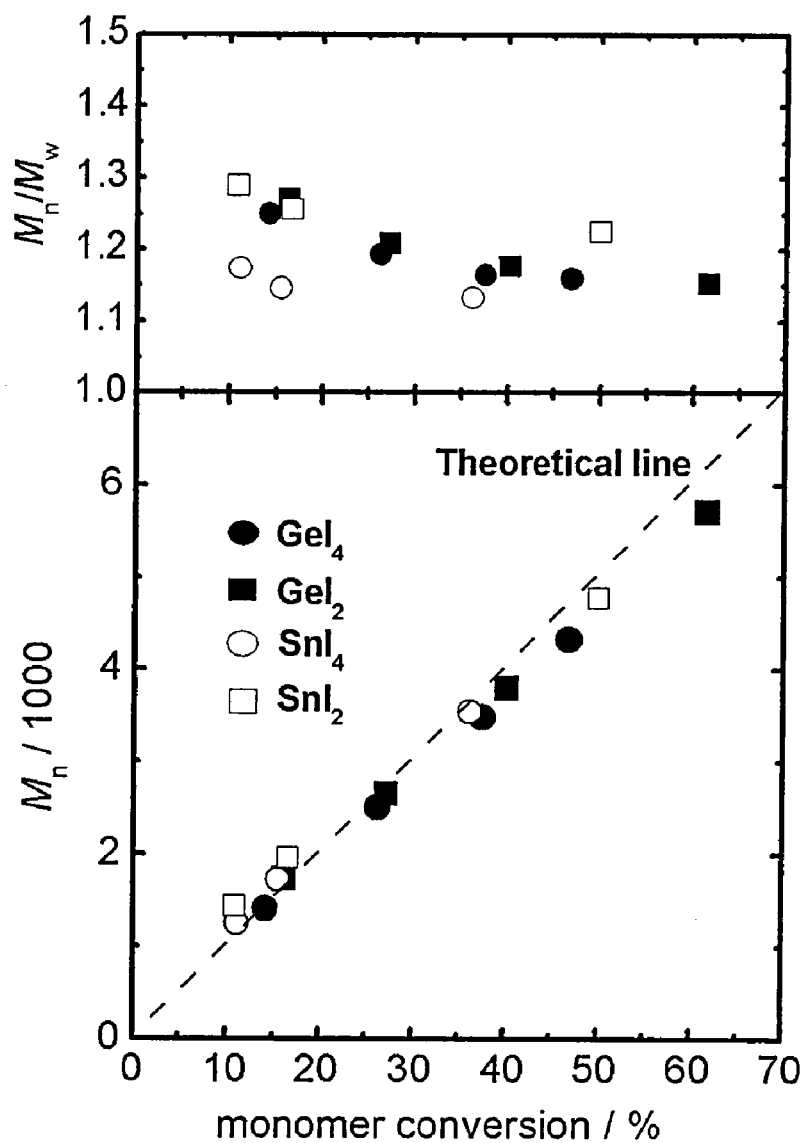
FIG. 2 shows a plot of Mn and $M_w/M_n$ vs. monomer conversion for the polymerization of styrene.

The results of the polymerization are shown in black circles in FIG. 2. The number average molecular weight, $M_n$, increased proportionately to the monomer conversion, which matched the theoretical values. The index of the polydispersity, $M_w/M_n$, was about 1.2 from an early stage of polymerization. That is, the index was small. This means that the frequency of activation (halogen exchange) was sufficiently high. The monomer conversion was 50% for 21 hours. In the absence of $GeI_4$, $M_w/M_n$ was about 1.5 even at a later stage of polymerization. When $GeI_2$, $SnI_4$, or $SnI_2$ was used instead of $GeI_4$, $M_w/M_n$ was also about 1.2, from an early stage of polymerization, as shown in FIG. 2. That is, $M_w/M_n$ was small. In all cases, a small amount of the catalyst (5 mM, 0.29 weight % in the reaction solution) was required to obtain a polymer having low polydispersity. This means that these catalysts have high catalytic activity.

The results of the experiments of the polymerization of styrene are summarized in Table 2. The values of Mw/Mn are described in the columns of "PDI (polydispersity index)" in the table. In an appropriate condition, a polymer having a very low polydispersity with a value of Mw/Mn lower than 1.1 was obtained (No. 10). Further, while attaining high monomer conversion, polymers having low polydispersities were obtained (for example, Nos. 3, 4, 6, 7, 9 and 13). Polymers having relatively high molecular weights and low polydispersities were also obtained by reducing the concentration of charged PE-I. For example, $GeI_4$-system yielded a polymer in which Mn is 11400 and Mw/Mn is 1.29 (No. 5), and $SnI_4$-system yielded a polymer in which Mn is 22000 and Mw/Mn is 1.18 (No. 11). The amount of the catalyst could be further reduced to 1 to 2 mM (0.06 to 0.12 wt % in the reaction solution) from the aforementioned amount (5 mM) to obtain polymers having low polydispersities (Nos. 2, 4 and 11). In Comparative Example 1, i.e., in the system containing no catalyst, Mw/Mn was 1.5 or more even at a later stage of polymerization. The polydispersity was higher than those of the experiments of polymerization of styrene using the catalyst of the present invention (Nos. C1 and C2). This means that the polydispersity was controlled by the actions of the catalysts. From the tacticity of the produced polymers, it was confirmed that the polymerization is a radical polymerization.

TABLE 1

The reaction solutions of the experiments of polymerization of styrene

| No. | Styrene | Organic halide (PE-I) | Initiator (I) | | Catalyst (XA) | | $[PE-I]_0/[I^a]_0/[XA]_0$ (mM) |
|---|---|---|---|---|---|---|---|
| 1 | 1 g | 0.0186 g | BPO | 0.0048 g | $GeI_4$ | 0.0029 g | 80/20/5 |
| 2 | 1 g | 0.0186 g | BPO | 0.0096 g | $GeI_4$ | 0.0012 g | 80/40/2 |
| 3 | 1 g | 0.0186 g | BPO | 0.0096 g | $GeI_4$ | 0.0029 g | 80/40/5 |
| 4 | 1 g | 0.0186 g | BPO | 0.0096 g | $GeI_4$ | 0.0012 g | 80/40/2 |
| 5 | 1 g | 0.0058 g | BPO | 0.0024 g | $GeI_4$ | 0.0029 g | 25/10/5 |
| 6 | 1 g | 0.0186 g | BPO | 0.0048 g | $GeI_2$ | 0.0016 g | 80/20/5 |
| 7 | 1 g | 0.0186 g | BPO | 0.0096 g | $GeI_2$ | 0.0032 g | 80/40/10 |
| 8 | 1 g | 0.0186 g | AIBN | 0.0033 g | $SnI_4$ | 0.0031 g | 80/20/5 |
| 9 | 1 g | 0.0186 g | AIBN | 0.0066 g | $SnI_4$ | 0.0031 g | 80/40/5 |
| 10 | 1 g | 0.0046 g | AIBN | 0.0007 g | $SnI_4$ | 0.0062 g | 20/4/10 |
| 11 | 1 g | 0.0019 g | AIBN | 0.0007 g | $SnI_4$ | 0.0006 g | 8/4/1 |
| 12 | 1 g | 0.0019 g | BPO | 0.0010 g | $SnI_4$ | 0.0024 g | 8/4/4 |
| 13 | 1 g | 0.0186 g | AIBN | 0.0033 g | $SnI_2$ | 0.0019 g | 80/20/5 |
| 14 | 1 g | 0.0093 g | AIBN | 0.0013 g | $SbI_3$ | 0.0020 g | 40/8/4 |
| C1 | 1 g | 0.0186 g | BPO | 0.0048 g | | 0 g | 80/20/0 |
| C2 | 1 g | 0.0093 g | AIBN | 0.0013 g | | 0 g | 40/8/0 |

BPO: Benzoyl peroxide
AIBN: Azobis(isobutyronitrile)

TABLE 2

Results of polymerization of styrene

| No. | XA | $[PE-I]_0/[I^a]_0/[XA]_0$ (mM) | T (° C.) | t (h) | Monomer conversion (%) | $M_n (M_{n,theo})^b$ | PDI |
|---|---|---|---|---|---|---|---|
| 1 | $GeI_4$ | 80/20/5 | 80 | 4 | 26 | 2500 (2600) | 1.19 |
| | | | | 7 | 37 | 3500 (3700) | 1.16 |
| | | | | 21 | 47 | 4300 (4700) | 1.16 |
| 2 | | 80/20/2 | 80 | 4 | 30 | 3300 (3000) | 1.17 |
| | | | | 7 | 47 | 4600 (4700) | 1.16 |
| 3 | | 80/40/5 | 80 | 4 | 44 | 3900 (4400) | 1.23 |
| | | | | 7 | 60 | 5300 (6000) | 1.20 |
| 4 | | 80/40/2 | 80 | 4 | 51 | 5200 (5100) | 1.27 |
| | | | | 7 | 85 | 8200 (8500) | 1.24 |
| 5 | | 25/10/5 | 80 | 21 | 40 | 11400 (13300) | 1.29 |
| 6 | $GeI_2$ | 80/20/5 | 80 | 4 | 26 | 2700 (2600) | 1.21 |
| | | | | 7 | 40 | 3800 (2700) | 1.18 |
| | | | | 21 | 59 | 5700 (5900) | 1.15 |
| 7 | | 80/40/10 | 80 | 4 | 32 | 2800 (3200) | 1.17 |
| | | | | 25 | 85 | 6800 (8500) | 1.16 |
| 8 | $SnI_4$ | 80/20/5 | 60 | 6 | 16 | 1700 (1600) | 1.15 |
| | | | | 21 | 36 | 3600 (3600) | 1.13 |
| 9 | | 80/40/5 | 60 | 27 | 72 | 7500 (7200) | 1.21 |
| 10 | | 20/4/10 | 60 | 21 | 8 | 3300 (3200) | 1.09 |
| 11 | | 8/4/1 | 60 | 21 | 24 | 22000 (24000) | 1.18 |
| 12 | | 8/4/4 | 80 | 21 | 16 | 15000 (16000) | 1.13 |
| 13 | $SnI_2$ | 80/20/5 | 60 | 6 | 17 | 2000 (1700) | 1.26 |
| | | | | 21 | 50 | 4800 (5000) | 1.23 |
| 14 | $SbI_3$ | 40/8/4 | 60 | 6 | 13 | 2800 (2600) | 1.39 |
| | | | | 16 | 31 | 6100 (6200) | 1.26 |

TABLE 2-continued

Results of polymerization of styrene

| No. | XA | [PE-I]$_0$/[I$^a$]$_0$/ [XA]$_0$ (mM) | T (° C.) | t (h) | Monomer conversion (%) | M$_n$ (M$_{n,theo}$)[b] | PDI |
|---|---|---|---|---|---|---|---|
| C1 | none | 80/20/0 | 80 | 4 | 41 | 4200 (4100) | 1.55 |
| C2 | | 40/8/0 | 60 | 5 | 10 | 4300 (2000) | 1.88 |
| | | | | 21 | 41 | 7900 (8200) | 1.80 |

[a]Benzoyl peroxide (BPO) was used at 80° C. Azobis(isobutyronitrile) (AIBN) was used at 60° C.
[b]Theoretically calculated value of Mn, which was calculated from [M], [PE-I] and monomer conversion. M refers to a monomer.

Example 2 and Comparative Example 2

Methyl Methacrylate (MMA)

The experiment was performed similarly to Example 1, with the proviso that in some experiments, methacrylonitrile-type alkyl iodide (MAN-I), which is a tertiary alkyl, was used in place of PE-I, which is a secondary alkyl. Further, catalysts, which are considered as having higher radical activity, were synthesized. A known reaction as shown in Scheme 2 was used to synthesize three kinds of catalysts, which have different substituents: CH$_3$PhGeI$_3$ (TGeI$_3$), CH$_3$OPhGeI$_3$ (AGeI$_3$), and PhGeI$_3$.

Scheme 2:

R—I+GeI$_2$→RGeI$_3$

The chemical formulas of PhGeI$_3$, TGeI$_3$ and AGeI$_3$ are shown below.

[Chemical formula 4]

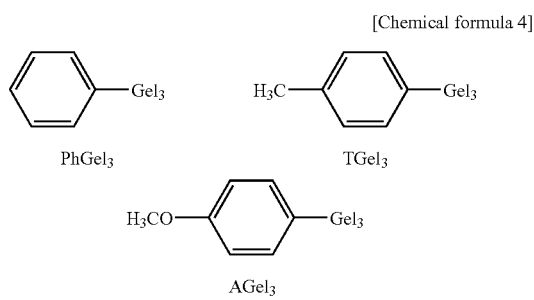

Alkyl iodides, the synthesized catalysts, and AIBN, which is a radical initiator, were used to perform polymerization of MMA at 70° C. The results of the polymerization are shown in Table 4. The experiments Nos. 1-10 were relevant to the experiments of Experiment 2. The experiment No. C1 was relevant to the experiment of Comparative Example 2.

In the experiment No. 1, the molecular weight was relatively low, and the polydispersity was relatively high. However, the result showed a superior activity of the catalyst (GeI$_4$) in comparison with those of the prior art transition metal complex-type catalysts. This confirms the effectiveness of the present invention.

The initiation efficiency was improved by using MAN-I as an alkyl iodide (No. 5 (about 100%) vs. No. 6 (about 20%)). The polymerization rate (hence activation rate) was increased by using PhGeI$_3$, AGeI$_3$, or TGeI$_3$ instead of GeI$_4$ as the catalyst, yielding polymers having controlled molecular weights and controlled polydispersities (Nos. 2-5). TGeI$_3$ achieved the largest polymerization rate (and activation rate). Thus, TGeI$_3$ achieved the best results of polymerization. Therefore, polymerization experiments with different composition ratios were performed using TGeI$_3$ as the catalyst. As a result, a polymer having M$_w$/M$_n$ of less than 1.2, i.e., a very low polydispersity was obtained (No. 7). A polymer having M$_n$ of more than 10,000, i.e., relatively high molecular weight, and a low polydispersity was also obtained (No. 9). Further, while achieving high monomer conversion, polymers having low polydispersities were obtained (for example, Nos. 5, 9, 10). In Comparative Example 2, i.e., the system containing no catalyst, Mw/Mn was 1.8 or more even at a later stage of polymerization. That is, the polydispersity was not controlled (No. C1).

TABLE 3

The Reaction solutions in the polymerization experiments of MMA

| No. | MMA | Organic halide (R-X) | | Initiator (I) | Catalyst (XA) | | [R-X]$_0$/[I]$_0$/ [XA]$_0$ (mM) |
|---|---|---|---|---|---|---|---|
| 1 | 1 g | PE-I | 0.0093 g | AIBN 0.0033 g | GeI$_4$ | 0.0116 g | 40/20/20 |
| 2 | 1 g | MAN-I | 0.0078 g | AIBN 0.0033 g | GeI$_4$ | 0.0116 g | 40/20/10 |
| 3 | 1 g | MAN-I | 0.0078 g | AIBN 0.0033 g | PhGeI$_3$ | 0.0053 g | 40/20/10 |
| 4 | 1 g | MAN-I | 0.0078 g | AIBN 0.0033 g | AGeI$_3$ | 0.0056 g | 40/20/10 |
| 5 | 1 g | MAN-I | 0.0078 g | AIBN 0.0033 g | TGeI$_3$ | 0.0054 g | 40/20/10 |
| 6 | 1 g | PE-I | 0.0093 g | AIBN 0.0033 g | TGeI$_3$ | 0.0054 g | 40/20/10 |
| 7 | 1 g | MAN-I | 0.0078 g | AIBN 0.0033 g | TGeI$_3$ | 0.0080 g | 40/20/15 |
| 8 | 1 g | MAN-I | 0.0078 g | AIBN 0.0033 g | TGeI$_3$ | 0.0027 g | 40/20/5 |
| 9 | 1 g | MAN-I | 0.0039 g | AIBN 0.0033 g | TGeI$_3$ | 0.0027 g | 20/20/5 |
| 10 | 1 g | MAN-I | 0.0156 g | AIBN 0.0066 g | TGeI$_3$ | 0.0054 g | 80/40/10 |
| C1 | 1 g | MAN-I | 0.0078 g | AIBN 0.0033 g | | 0 g | 40/20/0 |

TABLE 4

Results of polymerization of MMA

| No. | XA | R-X | [R-X]$_0$/[I$^a$]$_0$/[XA]$_0$ (mM) | T (° C.) | t (h) | Monomer Conversion (%) | M$_n$ (M$_{n,theo}$)$^b$ | PDI | |
|---|---|---|---|---|---|---|---|---|---|
| 1 | GeI$_4$ | PE-I | 40/20/20 | 70 | 6 | 4 | 4100 (800) | 1.60 | Note: c |
| 2 | GeI$_4$ | MAN-I | 40/20/10 | 70 | 4 | 10 | 2600 (2000) | 1.23 | Note: d |
| 3 | PhGeI$_3$ | MAN-I | 40/20/10 | 70 | 4 | 16 | 4000 (3200) | 1.25 | |
| 4 | AGeI$_3$ | MAN-I | 40/20/10 | 70 | 4 | 25 | 5000 (5000) | 1.22 | |
| 5 | TGeI$_3$ | MAN-I | 40/20/10 | 70 | 4 | 27 | 5000 (5400) | 1.24 | |
| | | | | | 8 | 60 | 7400 (12000) | 1.22 | |
| 6 | TGeI$_3$ | PE-I | 40/20/10 | 70 | 4 | 4 | 4000 (800) | 1.27 | Note: e |
| 7 | TGeI$_3$ | MAN-I | 40/20/15 | 70 | 4 | 19 | 3700 (4000) | 1.16 | |
| | | | | | 8 | 38 | 5500 (7200) | 1.19 | |
| 8 | TGeI$_3$ | MAN-I | 40/20/5 | 70 | 4 | 22 | 5000 (4400) | 1.20 | |
| | | | | | 6 | 34 | 6300 (6800) | 1.20 | |
| 9 | TGeI$_3$ | MAN-I | 20/20/5 | 70 | 4 | 38 | 10000 (15000) | 1.25 | |
| | | | | | 6 | 54 | 15000 (20000) | 1.25 | |
| | | | | | 8 | 60 | 18400 (24000) | 1.28 | |
| 10 | TGeI$_3$ | MAN-I | 80/40/10 | 70 | 4 | 51 | 5100 (5100) | 1.19 | |
| | | | | | 6 | 74 | 6900 (7400) | 1.21 | |
| C1 | none | MAN-I | 40/20/0 | 70 | 1 | 49 | 34400 (9800) | 1.81 | |
| | | | | | 10 | 99 | 30300 (20000) | 1.90 | |

Notes:
$^a$Azobis(isobutyronitrile) (AIBN).
$^b$Theoretically calculated value of Mn, which was calculated from [M], [R-X] and monomer conversion.
$^c$The polymerization of experiment No. 1 was not so controlled as the experiments of Nos. 2-10. The initiation efficiency was about 20%.
$^d$Polymerization rates (Activation rate): No. 2 < No. 3 < No. 4 < No. 5
$^e$The initiation efficiency was about 20%.

Please note that in addition to the aforementioned experiments, similar experiments were further performed with the proviso that a catalyst having Ge(II) as the central element was used. As a result, it was confirmed that the catalyst, which has Ge(II) as a central element, sufficiently acts as a catalyst for a living radical polymerization reaction of MMA.

Example 3

Glycidyl Methacrylate (GMA)

0.0078 g of MAN-I, which is an alkyl iodide, 0.0029 g of GeI$_4$, which is a catalyst, and 0.0048 g of BPO, which is a radical initiator, were added to 1 g of GMA. Polymerization of the GMA was performed at 70° C. The results of the polymerization are shown in the following Table 5.

TABLE 5

Results of polymerization of GMA

| No. | XA | R-X | [R-X]$_0$/[I$^a$]$_0$/[XA]$_0$ (mM) | T (° C.) | t (h) | Monomer Conversion (%) | M$_n$ (M$_{n,theo}$)$^b$ | PDI |
|---|---|---|---|---|---|---|---|---|
| 1 | GeI$_4$ | MAN-I | 40/20/5 | 70 | 0.67 | 20 | 6500 (5300) | 1.14 |
| | | | | | 1.33 | 49 | 14600 (13100) | 1.17 |
| | | | | | 1.67 | 64 | 21900 (17100) | 1.27 |

$^a$Benzoyl peroxide (BPO).
$^b$Theoretically calculated M$_n$, which was calculated from [M], [R-X], and the monomer conversion.

Example 4

Isoprene (Dienes)

0.0093 g of PE-I, which is an alkyl iodide, 0.0031 g of SnI$_4$, which is a catalyst, and 0.0097 g of BPO, which is a radical initiator, were added to 1 g of isoprene. Polymerization of the isoprene was performed at 80° C. The results of the polymerization are shown in the following Table 6.

TABLE 6

Results of polymerization of isoprene

| No. | XA | R-X | [R-X]$_0$/[I$^a$]$_0$/[XA]$_0$ (mM) | T (° C.) | t (h) | Monomer Conversion (%) | M$_n$ (M$_{n,theo}$)$^b$ | PDI |
|---|---|---|---|---|---|---|---|---|
| 1 | SnI$_4$ | PE-I | 40/40/5 | 80 | 21 | 8 | 1000 (1100) | 1.24 |

$^a$Benzoyl peroxide (BPO).
$^b$Theoretically calculated M$_n$, which was calculated from [M], [R-X], and the monomer conversion.

Comparative Example 3

Polymerization experiments were performed similarly to Example 1, with the proviso that the following formulations were used:

monomer: styrene, 8.0 M (1 g);

halogenated alkyl: 1-phenylethyl bromide, 80 mM (0.016 g) (This is abbreviated as "PEB" in the following table);

a catalyst: CuBr 5 mM (0.00071 g); and ligand: 4,4'-di-(5-nonyl)-2,2'-bipyridine 10 mM (0.0035 g).

Please note that no peroxide was used in these experiments, since it was technical common knowledge of those skilled in the art that no peroxide is used in cases of copper complex catalysts. The reasons are as follows: (1) in the cases of copper complex catalysts, the radical reaction is initiated even if a peroxide is not used; and (2) if a peroxide is added to a copper complex catalyst, then a termination (permanent inactivation) reaction of the growing species can occur significantly and as a result, the molecular weight distribution becomes broader. Specifically, for example, the aforementioned non-patent document 1 describes that reaction material which contains no peroxide is used.

The aforementioned material was dissolved in a monomer to obtain reaction solutions. The reaction solutions were heated to 80° C. The results are as follows.

TABLE 7

Results of polymerization with a copper complex

| No. | XA | [PEB]$_0$/[I$^a$]$_0$/[XA]$_0$ (mM) | T (° C.) | T (h) | Monomer Conversion (%) | M$_n$ | PDI |
|---|---|---|---|---|---|---|---|
| 1 | CuBr | 80/20/5 | 80 | 2 | 1.8 | 1200 | 1.40 |
|   |   |   |   | 4 | 3.5 | 1300 | 1.40 |
|   |   |   |   | 8 | 6.0 | 1400 | 1.38 |

As a result, the monomer conversion was much lower than those of styrene in Example 1. Further, the values of Mn after the reaction were 1200 to 1400, which are very low. Polystyrene having high molecular weight was not obtained. Furthermore, the values of Mw/Mn (PDI) were significantly larger than the values in the experiments of Example 1 which uses the catalyst of the present invention. Therefore, the activity of the transition metal catalyst is significantly inferior to the activity of the catalyst of the present invention.

As can be seen from the comparison of the results of Comparative Example 3 and the results of Example 1, the catalyst of the present invention has a significantly higher activity than a transition metal complex catalyst used in the prior art.

The aforementioned Examples show that the present invention has superior properties in comparison with the catalysts disclosed in the prior art.

For example, according to the Example described in the aforementioned non-patent document 1, the following reaction solution is subjected to the following reaction:

styrene: 8.7 M (1 g);

1-phenylethyl bromide: 87 mM (0.016 g);

CuBr: 87 mM (0.013 g); and 4,4'-di-(5-nonyl)-2,2'-bipyridine: 174 mM (0.076 g).

This reaction solution was heated to 110° C. for 7 hours, and a polymer was obtained. 0.089 g of the complex compound was used with respect to 1 g of the monomer. That is, the catalyst was used in a large amount of 8.9 weight % based on the monomer.

In comparison with this example in non-patent document 1, the present invention can significantly reduce the amount of catalyst used, and can also reduce the reaction temperature by 30 to 50° C., without the need for a ligand.

As described above, the present invention has been illustrated using the preferred embodiments of the present invention. However, the present invention should not be construed to be limited to these embodiments. It is understood that the scope of the present invention should be construed solely on the basis of the claims. It is understood that those skilled in the art can carry out an invention within the scope equivalent to the description of the specification, based on the description of the specific preferred embodiments, the description of the present invention and the common technical knowledge. It is understood that the patents, patent applications, and other documents cited in the present specification should be incorporated by reference in the present specification as if the contents thereof are specifically described herein.

INDUSTRIAL APPLICABILITY

As described above, the inventors obtained an invention of a new living radical polymerization method (a precisely controlled radical polymerization), which uses a typical element (germanium, tin, or antimony) as a catalyst. The method is characterized by the low toxicity of the catalyst, low amount of the catalyst necessary, high solubility of the catalyst (a ligand is unnecessary), mild reaction conditions, no coloration, no odor (treatment after a polymerization reaction is unnecessary), and the like. The method is significantly more environment-friendly and economically advantageous than the conventional living radical polymerization methods.

One half or more of the amount of polymer compounds produced in the world is produced by radical polymerizations. A living radical polymerization method can be applied to the production of high value added material, such as resist material, adhesive, lubricant, paint, ink, packaging material, pharmaceuticals, personal care products. The scale of the market is very large. Additionally, the method can be widely used as a satisfactory process for producing new material for electronics, material for optics, material for separation, or material for a living body.

What is claimed is:

1. A use of a catalyst in a living radical polymerization method, wherein the catalyst consists of a compound comprising at least one central element selected from germanium, tin or antimony, and at least one halogen atom which is bound to the central elements and wherein the method comprises a step of conducting a living radical polymerization reaction in the presence of the catalyst.

2. A use according to claim 1, in which the catalyst consists of a compound of the following general formula (I):

$$R^1{}_n MX^1{}_m \quad (I)$$

wherein, $R^1$ is aryl or substituted aryl,
n is an integer of 0 to 3,
M is a central element, which is germanium, tin, or antimony,
$X^1$ is a halogen,
m is an integer of 1 to 4.

3. A use according to claim 2, wherein $R^1$ is phenyl, lower alkyl phenyl or lower alkyloxyphenyl, $X^1$ is iodine, m is an integer of 2 to 4.

4. A use according to claim 3, wherein M is germanium, $R^1$ is phenyl, lower alkyl phenyl or lower alkyloxyphenyl, $X^1$ is iodine, m is an integer of 2 to 4.

5. A use according to claim 2, wherein M is tin or antimony, n is 0, $X^1$ is iodine, m is an integer of 2 to 4.

6. A method of conducting a living radical polymerization, comprising a step of conducting a living radical polymerization reaction of a monomer having a radically reactive unsaturated linkage, under the presence of a catalyst, wherein the catalyst consists of a compound comprising at least one central element selected from germanium, tin or antimony, and at least one halogen atom which is bound to the central element.

7. A method according to claim 6, wherein the living radical polymerization reaction is conducted under the presence of an organic halide having a carbon-halogen linkage and the catalyst.

8. A method according to claim 7, wherein the organic halide is a compound having the general formula (II):

$$CR^2R^3R^4X^2 \quad (II)$$

wherein, $R^2$ and $R^3$ are independently halogen, hydrogen or alkyl, $R^4$ is halogen, hydrogen, alkyl, aryl or cyano, $X^2$ is halogen.

9. A method according to claim 8, wherein a concentration of the catalyst is 1 weight % or less of the reaction solution, and the reaction temperature is 20° C. to 90° C.

10. A living radical polymerization composition, comprising a catalyst, an organic halide having a carbon-halogen linkage and a monomer having a radically reactive unsaturated linkage, wherein the catalyst consists of a compound of the following general formula (I):

$$R^1{}_n MX^1{}_m \quad (I)$$

wherein, $R^1$ is aryl or substituted aryl,
n is an integer of 0 to 3,
M is a central element,
when n is 0, M is germanium, and
when n is 1-3, M is germanium, tin, or antimony,
$X^1$ is a halogen, and
when M is germanium, $X^1$ is iodine or bromine, and
m is an integer of 1 to 4.

11. A composition according to claim 10, wherein $R^1$ is phenyl, lower alkyl phenyl or lower alkyloxyphenyl, $X^1$ is iodine, m is an integer of 2 to 4.

12. A living radical polymerization composition, comprising a catalyst, an organic halide having a carbon-halogen linkage and a monomer having a radically reactive unsaturated linkage, wherein the catalyst consists of a compound of the following general formula (I):

$$R^1{}_n MX^1{}_m \quad (I)$$

wherein, n is an integer of 1 to 3,
M is germanium, $R^1$ is phenyl, lower alkyl phenyl or lower alkyloxyphenyl, $X^1$ is iodine, m is an integer of 2 to 4.

13. A method according to claim 6, wherein the catalyst consists of a compound of the following general formula (I):

$$R^1{}_n MX^1{}_m \quad (I)$$

wherein, $R^1$ is aryl or substituted aryl,
n is an integer of 0 to 3,
M is a central element, which is germanium, tin, or antimony,
$X^1$ is a halogen,
m is an integer of 1 to 4.

14. A method according to claim 13, wherein $R^1$ is phenyl, lower alkyl phenyl or lower alkyloxyphenyl, $X^1$ is iodine, m is an integer of 2 to 4.

15. A method according to claim 14, wherein M is germanium, $R^1$ is phenyl, lower alkyl phenyl or lower alkyloxyphenyl, $X^1$ is iodine, m is an integer of 2 to 4.

16. A method according to claim 13, wherein M is tin or antimony, n is 0, $X^1$ is iodine, m is an integer of 2 to 4.

17. A composition according to claim 10, wherein the halogen atom of the organic halide is a bromine or iodine.

18. A living radical polymerization composition, comprising a catalyst and a monomer having a radically reactive unsaturated linkage, wherein the catalyst consists of a compound comprising at least one central element selected from germanium, tin or antimony, and at least one halogen atom which is bound to the central element, wherein the halogen atom is iodine or bromine, and wherein the composition does not comprise an episulfide compound.

* * * * *